(12) United States Patent
Okada et al.

(10) Patent No.: US 7,995,809 B2
(45) Date of Patent: Aug. 9, 2011

(54) REFINED SEGMENTATION OF NODULES FOR COMPUTER ASSISTED DIAGNOSIS

(75) Inventors: Kazunori Okada, Los Angeles, CA (US); Visvanathan Ramesh, Plainsboro, NJ (US); Arun Krishnan, Exton, PA (US); Maneesh K. Singh, Princeton, NJ (US); Umut Akdemir, Hamilton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1485 days.

(21) Appl. No.: 11/396,854

(22) Filed: Apr. 3, 2006

(65) Prior Publication Data

US 2006/0269109 A1 Nov. 30, 2006

Related U.S. Application Data

(60) Provisional application No. 60/672,277, filed on Apr. 18, 2005.

(51) Int. Cl.
*G06K 9/00* (2006.01)

(52) U.S. Cl. ......... 382/128; 382/130; 382/131; 382/132

(58) Field of Classification Search ............. 600/425, 600/410; 382/128, 173, 190, 203, 286, 131, 382/133, 264, 154, 206; 378/4, 41, 21
See application file for complete search history.

(56) References Cited

U.S. PATENT DOCUMENTS

| | | | | |
|---|---|---|---|---|
| 6,728,334 B1 * | 4/2004 | Zhao | ............................. | 378/62 |
| 6,947,784 B2 * | 9/2005 | Zalis | ............................. | 600/425 |
| 7,218,764 B2 * | 5/2007 | Vaisberg et al. | ............... | 382/129 |
| 7,519,209 B2 * | 4/2009 | Dawant et al. | ................. | 382/128 |
| 7,630,529 B2 * | 12/2009 | Zalis | .............................. | 382/128 |
| 7,680,335 B2 * | 3/2010 | Okada et al. | ................... | 382/190 |
| 7,760,941 B2 * | 7/2010 | Bornemann et al. | ........... | 382/173 |
| 2003/0095696 A1 * | 5/2003 | Reeves et al. | .................. | 382/131 |
| 2004/0184647 A1 * | 9/2004 | Reeves et al. | .................. | 382/131 |
| 2004/0252870 A1 * | 12/2004 | Reeves et al. | .................. | 382/128 |
| 2005/0036710 A1 | 2/2005 | Okada et al. | | |

(Continued)

FOREIGN PATENT DOCUMENTS

WO WO 02085211 A2 10/2002

OTHER PUBLICATIONS

U.S. Appl. No. 11/184,590, filed Jul. 19, 2005.

(Continued)

*Primary Examiner* — Daniel G Mariam
*Assistant Examiner* — Nancy Bitar
(74) *Attorney, Agent, or Firm* — Donald B. Paschburg (57) ABSTRACT

By testing for nodule segmentation errors based on the scan data, juxtapleural cases are identified. Once identified, the scan data or subsequent estimation may be altered to account for adjacent rib, tissue, vessel or other structure effecting segmentation. One alteration is to shape a filter as a function of the scan data. For example, an originally estimated ellipsoid for the nodule segmentation defines the filter. The filter is used to identify the undesired information, and masking removes the undesired information for subsequent estimation of the nodule segmentation. Another possible alteration biases the subsequent estimation away from the incorrect information, such as the rib, tissue or vessel information influencing the original estimation. For example, a negative prior or probability is assigned to data corresponding to the originally estimated segmentation for the subsequent estimation.

28 Claims, 3 Drawing Sheets

U.S. PATENT DOCUMENTS

| | | | |
|---|---|---|---|
| 2005/0096525 A1 | 5/2005 | Okada et al. | |
| 2005/0135663 A1 | 6/2005 | Okada et al. | |
| 2005/0201606 A1 | 9/2005 | Okada et al. | |
| 2006/0023927 A1* | 2/2006 | Zhang et al. | 382/131 |

OTHER PUBLICATIONS

U.S. Serial No. ; filed Mar. 9, 2006.

Reeves, A.P., Kostis, W.J.: Computer-aided diagnosis of small pulmonary nodules. Seminars in Ultrasound, CT, and MRI 21 (2000) 116-128.

van Ginneken, B., ter Harr Romeny, B.M., Viergever, M.A.: Computer-aided diagnosis in chest radiography: A survey. IEEE Trans. Med. Imag. 20 (2001) 1228-1241.

Ko, J.P., Naidich, D.P.: Computer-aided diagnosis and the evaluation of lung disease. J. Thorac Imag. 19 (2004) 136-155.

Ko, J.P., et al.: Small pulmonary nodules: Volume measurement at chest CT—phantom study. Radiology 228 (2003) 864-870.

Wormanns, D., Kohl, G., Kotz, E., Marheine, A., Beyer, F., Heindel, W., Diederich, S.: Volumetric measurements of pulmonary nodules at multi-row detector CT: in vivo reproducibility. Eur. Radiol. 14 (2004) 86-92.

Zhao, B., Yankelevitz, D., Reeves, A., Henschke, C.: Two-dimensional multi-criterion segmentation of pulmonary nodules on helical CT images. IEEE Trans. Med. Imag. 22 (2003) 1259-1274.

Kostis, W.J., Reeves, A.P., Yankelevitz, D.F., Henschke, C.I.: Three-dimensional segmentation and growth-rate estimation of small pulmonary nodules in helical CT images. IEEE Trans. Med. Imag. 22 (2003) 1259-1274.

Okada, K., Comaniciu, D., Krishnan, A.: Robust anisotropic Gaussian fitting for volumetric characterization of pulmonary nodules in multislice CT. IEEE Trans. Med. Imag. 24 (2005) 409-423.

Armato, S., Giger, M., Moran, C., Blackburn, J., Doi, K., MacMahon, H.: Computerized detection of pulmonary nodules on CT scans. RadioGraphics 19 (1999) 1303-1311.

Wang, P., O'Dell, W.: Automated detection of juxta-pleural lung nodules in chest CT using lung contour corrected by anatomic landmarks. In: 46th Annual AAPM Meeting, Pittsburgh PA (2004).

Shen, H., Liang, L., Shao, M., Qing, S.: Tracing based segmentation for the labeling of individual rib structures in chest CT volume data. In: MICCAI. (2004).

Okada, K., Comaniciu, D., Krishnan, A.: Scale selection for anisotropic scale-space: Application to volumetric tumor characterization. In: IEEE Conf. Comput. Vision and Pat. Recog. (2004).

Lee, Y., Hara, T., Fujita, H., Itoh, S., Ishigaki, T.: Automated detection of pulmonary nodules in helical CT images based on an improved template-matching technique. IEEE Trans. Med. Imag. 20 (2001) 595-604.

Novak, C., Shen, H., Odry, B., Ko, J., Naidich, D.: System for automatic detection of lung nodules exhibiting growth. In: SPIE Med. Imag. (2004).

Comaniciu, D.: An algorithm for data-driven bandwidth selection. IEEE Trans. Pat. Anal. Mach. Intell. 25 (2003) 281-288.

Henschke, C.I., Yankelevitz, D.F., Mirtcheva, R., McGuinness, G., McCauley, D., Miettinen, O.S.: CT screening for lung cancer: frequency and significance of part-solid and non-solid nodules. AJR Am. J. Roentgenol. 178 (2002) 1053-1057.

Okada, K., Comaniciu, D., Krishnan, A.: Robust 3D segmentation of pulmonary nodules in multislice CT images. In: MICCAI, Saint Malo (2004).

Enquobahrie, Andinet A.; Reeves Anthony P; Yankelevitz, David F.; Henschke, Claudia I. "Automated detection of pulmonary nodules from whole lung hlical CT scans: performance comparison for isolated and attached nodules" Proceedings of the SPIE, vol. 5370, pp. 791-800.

* cited by examiner

REFINED SEGMENTATION OF NODULES FOR COMPUTER ASSISTED DIAGNOSIS

RELATED APPLICATIONS

The present patent document claims the benefit of the filing date under 35 U.S.C. §119(e) of Provisional U.S. Patent Application Ser. No. 60/672,277, filed Apr. 18, 2005, which is hereby incorporated by reference.

BACKGROUND

The present embodiments relate to segmentation. In particular, nodules or other structures are identified from scan data, such as from computed tomography data.

Pulmonary nodule segmentation is one goal of computer-assisted diagnosis (CAD) for identifying lung tumors. For example, a CAD system identifies pulmonary nodules from chest computed tomography (CT) data. A semi-automatic robust segmentation solution may realize reliable volumetric measurement of nodules as part of lung cancer screening and management.

Intensity-based segmentation solutions, such as local density maximum algorithms, segment nodules in CAD systems. Although such solutions may perform satisfactorily for solitary nodules, these solutions may not separate nodules from juxtaposed surrounding structures, such as walls and vessels, due to similar intensities. Approaches that are more sophisticated have been proposed to incorporate nodule-specific geometrical constraints. However, juxtapleural, or wall-attached, nodules remain as a challenge because such nodules may not conform to standard geometrical assumptions. Another source of problem is rib bones which appear with high intensity values in CT data. Such high-intensity regions near a possible nodule may bias estimation of the nodule center.

Two approaches provide robust segmentation of juxtapleural cases. In a first approach, a global lung or rib segmentation is performed prior to the nodule segmentation. This global approach may be effective but also computationally complex and dependent on the accuracy of the whole-lung segmentation. In a second approach, a local non-target removal or avoidance is performed prior to the nodule segmentation. This local approach may be more efficient than the global approach but more difficult to achieve high performance due to the limited amount of information available for the non-target structures.

BRIEF SUMMARY

By way of introduction, the preferred embodiments described below include methods, systems or computer readable media for refined segmentation of nodules in computer-assisted diagnosis. By testing for nodule segmentation errors based on the scan data, juxtapleural cases are identified. Once identified, the scan data or subsequent estimation may be altered to account for adjacent rib, tissue, vessel or other structure effecting segmentation. One alteration is to shape a filter as a function of the scan data. For example, an ellipsoid from an originally estimated segmentation defines the filter. The filter is used to identify the undesired information, and masking removes the undesired information for subsequent estimation of the nodule segmentation. Another possible alteration biases the subsequent estimation away from the incorrect information, such as the rib, tissue or vessel information influencing the original estimation. For example, a negative prior is assigned to data corresponding to the originally estimated segmentation for the subsequent estimation. Any of the testing, filtering alteration, bias alteration or combinations thereof may be used.

In a first aspect, a method is provided for refined segmentation of nodules in computer-assisted diagnosis. A processor tests a first processor determined segmentation as a function of scan data. The processor alters the scan data, a parameter or the scan data and a parameter where the first processor determined segmentation fails the testing. A second processor determined segmentation is determined as a function of the altered scan data, the parameter or the altered scan data and the parameter.

In a second aspect, a system is provided for refined segmentation of nodules in computer-assisted diagnosis. A processor is operable to test a first segmentation as a function of scan data, operable to alter the scan data, a parameter or the scan data and a parameter where the first segmentation fails the testing, and operable to determine a second segmentation as a function of the altered scan data, parameter or scan data and parameter. A display is operable to output an indication of the second segmentation.

In a third aspect, a computer readable storage media has stored therein data representing instructions executable by a programmed processor for refined segmentation of nodules in computer assisted diagnosis. The storage media has instructions for: testing a first nodule estimation as a function of scan data, altering the scan data, nodule estimation or both the scan data and nodule estimation if the first nodule estimation fails the testing, and determining a second nodule estimation as a function of the altered scan data, the altered nodule estimation or the altered scan data and the altered nodule estimation.

In a fourth aspect, a computer readable storage media has stored therein data representing instructions executable by a programmed processor for refined segmentation of nodules in computer assisted diagnosis. The storage media has instructions for: determining a filter shape as a function of scan data, filtering the scan data as a function of the filter shape, and segmenting a first nodule as a function of the filtered scan data.

In a fifth aspect, a computer readable storage media has stored therein data representing instructions executable by a programmed processor for refined segmentation of nodules in computer assisted diagnosis. The storage media has instructions for: determining a first nodule estimation, identifying the first nodule estimation as associated with a possible juxtapleural nodule, and biasing determination of a second nodule estimation away from the first nodule estimation.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The embodiments may provide robust pulmonary nodule segmentation in computed tomography (CT) by improving segmentation for juxtapleural cases. By testing segmentation results, juxtapleural cases may be identified. Incorrect segmentation due to surrounding structure may be avoided by alteration. For juxtapleural cases, alteration is provided by local non-target removal and/or avoidance approaches. In one approach, the lung wall region within an input sub-volume is detected and removed. For example, a 3D binary morphological opening operation is used. By using the scan data to identify a structuring element, such as a data-driven ellipsoidal 3D structuring element, the morphological operation more likely results in removal of undesired information. In another approach, an extended mean shift framework incorporates a repeller (negative) prior which tends the convergence away from a specific data point or points. This prior-constrained mean shift is used for correctly detecting the nodule center despite the presence of rib bones. The segmentation accuracy may be improved without removal of data representing the walls and ribs.

In one embodiment, both proposed solutions are realized as extensions of a robust anisotropic Gaussian fitting solution, but other segmentation algorithms may be used. An ellipsoidal structuring element and/or the repeller prior are derived from the Gaussian fitting.

The embodiments may be used for other imaging modalities, such as magnetic resonance imaging, ultrasound, x-ray, positron emission or other now known or later developed imaging modes. Data for two- or three-dimensional scans may be used. The embodiments may alternatively be used for isolated or non-juxtapleural cases.

Figure 1:
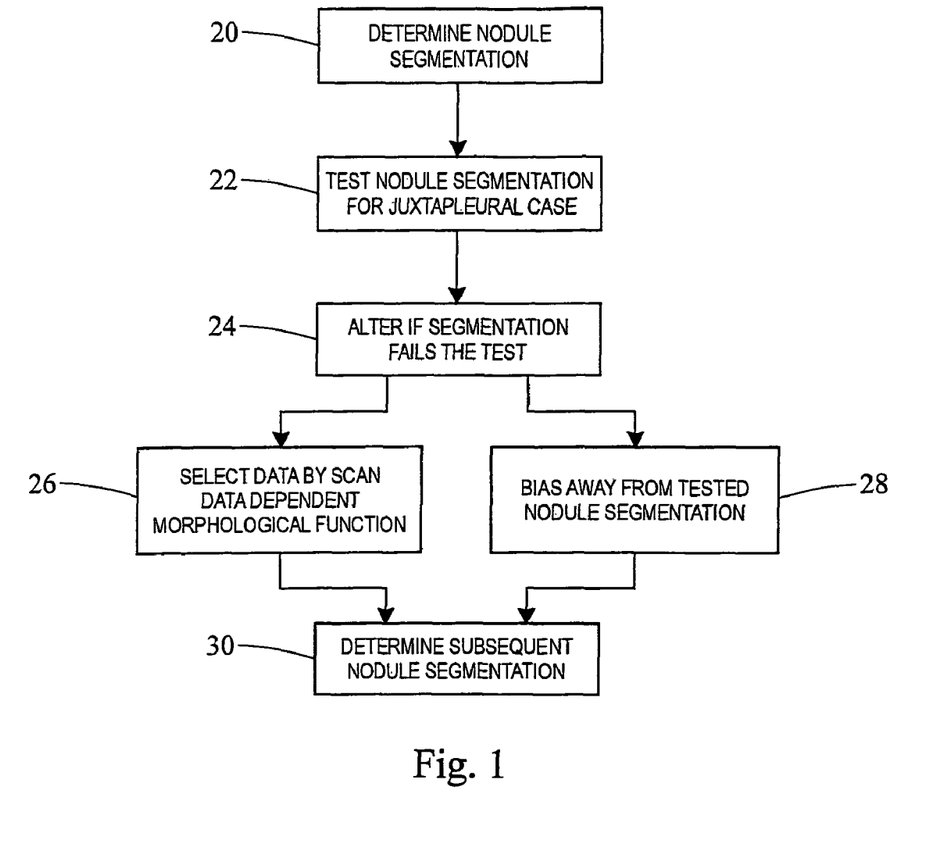
FIG. 1 is a flow chart diagram of one embodiment of a method for refined segmentation of nodules in computer-assisted diagnosis.

FIG. 1 shows one embodiment of a method for refined segmentation of nodules in computer-assisted diagnosis. The method is implemented by the system of FIG. 4 or a different system, such as a personal computer, a network server, or an imaging workstation. The method implements the acts in the order shown or a different order. Additional, different or fewer acts may be provided. For example, act 26 and not 28 is performed or vice versa with or without any other acts. As another example, acts 22, 24 and 30 are performed without acts 26 and/or 28.

In act 22, a nodule estimation is determined. The nodule estimation is a segmentation of a possible nodule. The determination is performed automatically or semi-automatically by a processor, resulting in a processor determined segmentation.

The segmentation is local, such as estimating the nodule in a sub-region of scan data representing a plane or volume. For example, a 33×33×33 voxel sub-volume is used. The region is larger than likely nodules, such as being larger than 30 mm, 50 mm or other value in diameter. Other sizes with cube, spherical or other shaped regions may be used, such as a global region. The scan data is CT data or another type of data.

The local region is selected automatically by the processor or in response to user input. A marker is established from a radiologist's readings by eye-appraisal or the outcome of an automatic nodule detection system. For example, an algorithm is applied globally to determine regions likely associated with nodules. As another example, the user inputs a point, area or volume likely associated with a nodule. The local region is centered at the user input location or over a determined area or volume. In alternative embodiments, a global segmentation is performed.

After identifying the local region, nodule segmentation is performed for the local region. The local region may include an isolated nodule or a juxtapleural nodule. Pulmonary or other nodule segmentation is performed on the scan data for the local region. Any now known or later developed segmentation algorithm may be used, such as filtering, trained neural network, Bayesian, or other classifier based segmentation.

In one embodiment, the segmentation is performed with a Gaussian fitting function. A Gaussian function, such as a two or three-dimensional Gaussian function, is fit to the scan data. For example, one or more of the segmentation processes described in U.S. Patent Application Publication Nos. 2005/0036710, 2005/0096525, 2005/0135663, 2005/0201606, or 2006/0050958, the disclosures of which are incorporated herein by reference, are performed. One robust anisotropic Gaussian fitting identifies the nodule represented by the computed tomography scan data. Semi-automatic (e.g., one-click) 3D nodule segmentation is provided. The one-click segmentation uses a marker $x_p$ indicating a rough location of the target nodule. A 3D Gaussian function is fit to the scan data associated with the marker. The nodule's 3D boundary is approximated by a 35%, 50% or other confidence ellipsoid of the fitted Gaussian, determined empirically. Other structures than an ellipsoid may be used, such as a sphere, cube or irregular structure.

For computational efficiency, the algorithm is applied to a sub-volume $V(x)$ centered at the marker $x_p$ and extracted from CT volume data $I(x): R^3 \rightarrow R_+$, such as 12-bit CT scan data. The algorithm provides a Gaussian function which best or sufficiently fits the local intensity distribution of the target nodule. The fit is represented as: $I(x) \approx \alpha \times \Phi(x;u,\Sigma)|_{x \in S}$ where $\Phi(x;u,\Sigma) = |2\pi\Sigma|^{-1/2} \exp(-\frac{1}{2}(x-u)'\Sigma^{-1}(x-u))$ is the anisotropic 3D Gaussian function, $\alpha$ is a positive magnitude factor, S is a local neighborhood forming a basin of attraction of the target, u is the fitted Gaussian mean indicating the estimated nodule center, and $\Sigma$ is the fitted Gaussian covariance matrix indicating the nodule's anisotropic spread. u is the convergence of the local maximum (e.g., gradient) using the fit function.

$\alpha$ and S may not be calculated. Instead, the algorithm performs a multiscale analysis by considering a Gaussian scale-space of the input sub-volume. The Gaussian scale-space $L(x;h)$ is a solution of the diffusion equation $$\partial_h L = \frac{1}{2} \nabla^2 L$$

with an initialization $L(x;0)=I(x)$. Such a scale-space is defined by a convolution of $I(x)$ with a Gaussian kernel $K_H(x)$ with a bandwidth matrix H: $L(x;h)=I(x)*K_H(x;H=h_I)$. The algorithm considers a Gaussian scale-space constructed over a set of densely sampled discrete analysis scales $\{h_k | k=1 \ldots K\}$. At each analysis scale, a fixed-scale robust analysis is performed for fitting an anisotropic Gaussian function in each scale space image. The mean, u, and covariance, $\Sigma$, are determined for each scale or level of smoothing (i.e., bandwidth).

The fixed-scale analysis performs a robust Gaussian fitting with scale-space mean shift, a convergent weighted mean shift defined in the Gaussian scale-space, represented as:

$$m(x;H_k) = \frac{\int x' K_H(x-x';H_k) I(x') dx'}{\int K_H(x-x';H_k) I(x') dx'} - x = h_k \frac{\nabla L(x;h_k)}{L(x;h_k)} \quad (1)$$

The Gaussian mean u as the nodule center is estimated by the convergence of the majority of initial seeds sampled around the marker $x_p$. A set of new seeds are sampled around the estimated mean u. The mean shift procedures are then performed from each seed. Gaussian covariance is estimated by a constrained least-squares solution of a linear system with unknown $\Sigma$, constructed with mean shift vectors only along the convergent trajectories. The linear system may be constructed with a response-normalized scale-space Hessian.

Given a set of estimated Gaussians, the most stable estimate across the scales determines the final outcome. In one embodiment, an error between the estimated segmentation provided by the Gaussians and the scan data is computed. In other embodiments, such as where the error may be large or erratic, the set of estimated Gaussians is examined to identify a most stable estimate as a function of the changing bandwidth. The multiscale analysis, given a set of Gaussians estimated at the analysis scales $\{(u_k, \Sigma_k)\}$, is realized by finding the most stable estimate among others using a divergence-based stability test, but other tests may be used. One example algorithm employs the Jensen Shannon divergence (JSD) of three neighboring Gaussians computed at each analysis scale. Assuming the normal form of distributions, JSD is expressed in the following simple form:

$$JSD(k) = \frac{1}{2}\log\frac{\left|\frac{1}{3}\sum_{i=k-1}^{k+1}\Sigma_i\right|}{\sqrt[3]{\prod_{i=k-1}^{k+1}|\Sigma_i|}} + \frac{1}{2}\sum_{i=k-1}^{k+1}(u_i - u)^t\left(\sum_{i=k-1}^{k+1}\Sigma_i\right)^{-1}(u_i - u) \quad (2)$$

where $$u = \frac{1}{2}\sum_{k-1}^{k+1}ui.$$

The minimization of the JSD profile across the scales $h_k$ results in the most-stable-over-scales estimate $(u^*, \Sigma^*)$.

The robustness is due to two aspects of this algorithm. First, the fixed-scale Gaussian fitting solution performs robust model fitting with the outlier removal using the scale-space mean shift convergence analysis. u is determined from equation 1 for each h where the outlier is information not estimated as part of the nodule. Convergence of m to a peak with outlier removal more likely reduces the effects of other structures. This helps to mitigate the problem of juxtaposed neighboring structures, such as ribs, chest walls or vessels. Second, the usage of the stability-based scale selection robustifies the fitting process even for intensity distributions that do not follow the Gaussian assumption well. This facilitates the electiveness of the solution for segmenting clinically significant but technically challenging ground glass or other types of nodules.

Despite the robustness, some juxtapleural or other cases may result in inaccurate segmentation. The robust Gaussian fitting solution or other segmentation estimation may be further extended for handling not only solitary but also the juxtapleural cases. The robust Gaussian fitting or other segmentation estimation is performed, and the results are tested in act 22, such as with a goodness-of-fit test. A processor tests, automatically or semi-automatically, nodule estimation as a function of scan data. The testing identifies the nodule estimation as associated with a possible juxtapleural nodule, such as the testing identifying a possible wall attached nodule.

The computed tomography or other scan data is compared to the pulmonary or other nodule segmentation. For example, errors between the processor determined segmentation and the scan data are analyzed. In one embodiment, chi-square errors between the data and the model are calculated, but other error calculations may be used. In another embodiment, a linear DC bias is evaluated. Other heuristic tests, such as using a trained neural network or other classifier, may be used. Combinations of tests may be used, such as a chi-square error analysis in combination with a linear DC bias test. Any threshold or other determination for a segmentation to fail or pass the test may be provided, such as error thresholds or heuristic outcomes based on training or data sets with known truths.

When the initial fitting results fail to pass the test in act 22, a further process is performed to provide a possible more accurate segmentation or nodule estimation. One or more different further processes may be used, including any now known or later developed processes. In general for the robust Gaussian segmentation, most gross segmentation failures detected by the chi-square error analysis in combination with the linear DC bias goodness-of-fit test may be due to juxtapleural cases. The initial fitted Gaussians for such failures may tend to approximate the wall and rib structures. Segmentation solutions which employ the initial fitted Gaussian as an input to their process may exploit these observations.

In one embodiment, the processor performs an alteration with the further process in act 24. The scan data, nodule estimation process, a parameter for the estimation process, combinations thereof or other alterations are performed. In one embodiment, scan data is altered as a function of a morphological function based on the initial segmentation. In another embodiment, subsequent segmentation estimation is weighted away from the initial segmentation. The initial segmentation is considered inaccurate by failing the test. This failure may be used to influence later segmentation to identify a nodule and not other structure. Other embodiments which are or are not a function of the initial segmentation may be used.

In the embodiment for altering scan data in act 24, scan data not associated with undesired structure is selected, or scan data associated with undesired structure is removed in act 26. For example, wall removal is performed by three-dimensional morphological opening. The selection or removal is a function of a morphological function. The morphological function is responsive to the scan data, such as being a function of the initial segmentation likely representing undesired structure. Any morphological function may be used, such as determining a filter shape as a function of scan data or as a function of an ellipsoid responsive to the initial fitting.

The input sub-volume of the juxtapleural failure case may contain lung wall regions. Such wall regions appear typically as a large connected region with CT values higher than surrounding pulmonary parenchyma. The juxtapleural nodule may appear as a nodular structure partially embedded into the wall. The wall regions are removed from the sub-volume using the morphological operation. The robust Gaussian fit or other segmentation is then performed on the wall-removed scan data, resulting in an improved segmentation of the target nodule.

Figure 2:
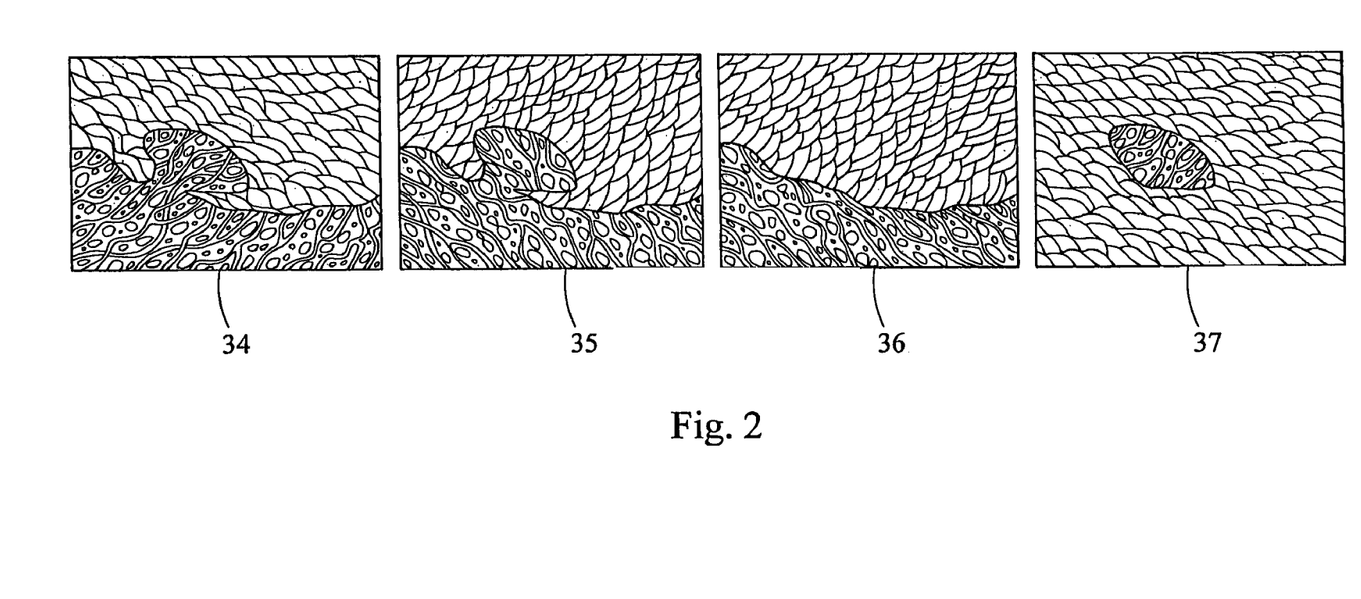
FIG. 2 is a graphical example of one embodiment of refining segmentation as a function of scan data.

FIG. 2 graphically represents one possible algorithm for selection or removal of scan data dependent on a morphological function. The inputs include the sub-volume V(x), the marker $x_p$, and the fitted Gaussian $(u^*, \Sigma^*)$ which failed the goodness-of-fit test. The image at 34 shows the sub-volume in a two-dimensional cross-section where the lighter region represents a nodule embedded on a wall. Scan data associated with undesired structure, such as wall regions, is removed from V(x), resulting in $V_r(x)$ represented at the image labeled 37.

As shown for the image at 35, the scan data is binarized or converted to a binary representation. A threshold, such as a value of 500 for scan data with a dynamic range of 0 to 4,095, is applied to the scan data. The threshold is an intensity threshold. Other thresholds or threshold values may be used.

The morphological function is calculated, at least in part, based on the initial nodule estimation, a sphere, an ellipsoid, combinations thereof or other shapes. For example, a three-dimensional structural element is initialized as a function of the initial nodule estimation if the average diameter is greater than a threshold and as a function of a predetermined structure if the average diameter is less than the threshold. An average diameter $d_{ave}$ of the ellipsoid defined by the initial segmentation covariance $\Sigma^*$ is calculated. If the average diameter is greater than a threshold, the morphological function is a three-dimensional structure, E, defined by the initial segmentation $\Sigma^*$, $E=\Sigma^*$. Any threshold may be used, such as 16.6 voxels or a particular size. Otherwise, the three-dimensional structure, E, is set to a three-dimensional sphere with a fixed radius, such as 14 voxels or a particular size. Other thresholds, radii, shapes or sizes may be used. Two-dimensional processing may be used. This data-dependent ellipsoidal structuring element is estimated for each sub-volume or possible undesired structure. The structuring elements have a same or different sizes.

The structure, E, represents a filter shape. Filtering with the data derived filter shape allows single or multiple pass smoothing and/or sharpening to select or remove scan data. The scan data is filtered as a function of the filter shape. The filtering performs a morphological opening as a function of the morphological function. For example, a three-dimensional binary morphological opening is performed as a function of the three-dimensional structural element, E, resulting in smoothed volume $B_s(x)$ retaining only the large wall region: $B_s(x)=[B_o(x)\ E] \oplus E$. The image at 36 shows the results of the filtering the binary scan data as a function of the structural element.

The scan data of the original sub-volume, represented at 34, is masked as a function of an output of the three-dimensional binary morphological opening represented at 36. The masking selects the data of interest or removes the undesired data. For example, a wall removal is performed by masking V(x) with the negative of $B_s(x)$: $V_r(x)=V(x)\times NOT[B_s(x)]$. In act 30, segmentation is performed on the altered scan data, such as performing the robust Gaussian fitting algorithm on $V_r(x)$ with $x_p$. The segmentation may provide improved nodule segmentation ($u_{wr}$, $\Sigma_{wr}$).

In an alternative or additional embodiment in act 28 of FIG. 1, the segmentation estimation is biased away from the failed segmentation or nodule estimation. The biasing may be performed as disclosed in U.S. Pat. No. 7,680,335, filed Mar. 10, 2006, the disclosure of which is incorporated herein by reference, for juxtapleural cases. The convergence for a subsequent segmentation is influenced or pushed away from the wrong result. For example, the ellipsoid output by the initial segmentation influences the later segmentation. For a juxtapleural nodule, determination of the nodule estimation is shifted away from wall or rib structure represented by the computed tomography scan data and adjacent the possible juxtapleural nodule. The initial nodule estimation is assumed to be associated with the wall or rib structure. The subsequent nodule center is detected without an explicit removal of data representing the walls and/or ribs.

In the Gaussian fitting-based segmentation, the mean shift is constrained by a Gaussian repelling prior. The prior-constrained mean shift incorporates spatial prior information to the data-driven mean shift analysis. A negative prior is assigned to scan data for at least one location associated with the initial nodule estimation or segmentation. The previous robust Gaussian fitting is performed on the sub-volume V(x), resulting in the nodule center and spread estimate ($u^*$, $\Sigma^*$). This fitted Gaussian is interpreted as a normal probability distribution Q(x) indicating a likelihood of x being the estimated center, represented as:

$$Q(x)=N(x;u^*,\Sigma^*)=|2\pi\Sigma^*|\exp(-\tfrac{1}{2}(x-u^*)^t\Sigma^{*-1}(x-u^*)) \quad (3)$$

Q(x) has a highest value when $x=u^*$. Failing the goodness-of-fit test indicates that the estimated location $u^*$ is not at the center of the target nodule and that the estimated spread $\Sigma^*$ roughly expresses the extent of the (rib/wall) structure which falsely attracted the mean shift convergence away from the true nodule center. The nodule center may be re-estimated with the constrained mean shift whose convergence is biased by the knowledge of Q(x) so as to push the convergence away from the failed estimate $u^*$.

To incorporate such a repelling (negative) prior, equation 3 is inverted and applied as a parameter alteration in subsequent segmentation or nodule estimation. The scan data, I(x), is resampled or associated with weights to denote the notion that some data points are more likely than others. Prior-induced positive weights are defined by a negative of Q(x), represented as:

$$w_Q(x)=1-|2\pi\Sigma^*|^{1/2}Q(x) \quad (4)$$

Incorporating the negative prior leads to the following resampled scale-space $\tilde{L}(x; h)$ expressed in the discretized data space:

$$\tilde{L}(x; h) = \sum_{i=1}^{N} w_Q(x_i)I(x_i)K_h(x - x_i). \quad (5)$$

The mean shift $m_r(x;h, Q)$ convergent to a mode in $\tilde{L}(x; h)$ is the negative prior-constrained scale-space mean shift. The negative prior-constrained scale-space mean shift is defined by:

$$m_r(x; h, Q) = \frac{\sum_i x_i K_h(x - x_i)I(x_i)w_Q(x_i)}{\sum_i K_h(x - x_i)I(x_i)w_Q(x_i)} - x \quad (6)$$

The convergence property is maintained because $w_Q(x_i) \geq 0 \forall x_i$.

With the negative prior, the segmentation is performed again. For example, the Gaussian function is applied to the computed tomography scan data as a function of biases associated with the initial nodule estimation. A new Gaussian fitting solution is constructed in act 30 by replacing the original scale-space mean shift by the prior-constrained mean shift (equation 1 replaced with equation 6) in the robust fitting algorithm. Given an initial Gaussian ($u^*$, $\Sigma^*$) failing the goodness-of-fit test, this new solution with $m_r(x; h, Q)$ is executed on the original data V(x), resulting in an improved segmentation with ($u_{ms}$, $\Sigma_{ms}$).

Acts 26 and 28 may be used independently or together. The results from both acts 26 and 28 may be combined, such as averaged or a best fit to the results determined. The process of act 26 may be used to guide or refine the process of act 28 or vise versa. Alternatively, act 26 is performed without performing act 28, or act 28 is performed without performing act 26.

In act 30, another processor determined segmentation or nodule estimation is determined as a function of the altered scan data, the altered parameter, the altered nodule estimation or combinations thereof. The same or different segmentation is performed, such as determining as a function of the three-dimensional Gaussian fitting function. The subsequent segmentation is determined as a function of negative priors or scan data with removed or selected information. For removed or selected data, the nodule is segmented as a function of the filtered scan data masked to identify data more likely associated with a nodule. For biased data, the nodule is segmented as a function of the scan data with the mean-shift influenced by the prior segmentation. Alteration may allow better pulmonary nodule segmentation of a juxtapleural nodule with computed tomography data.

Figure 3:
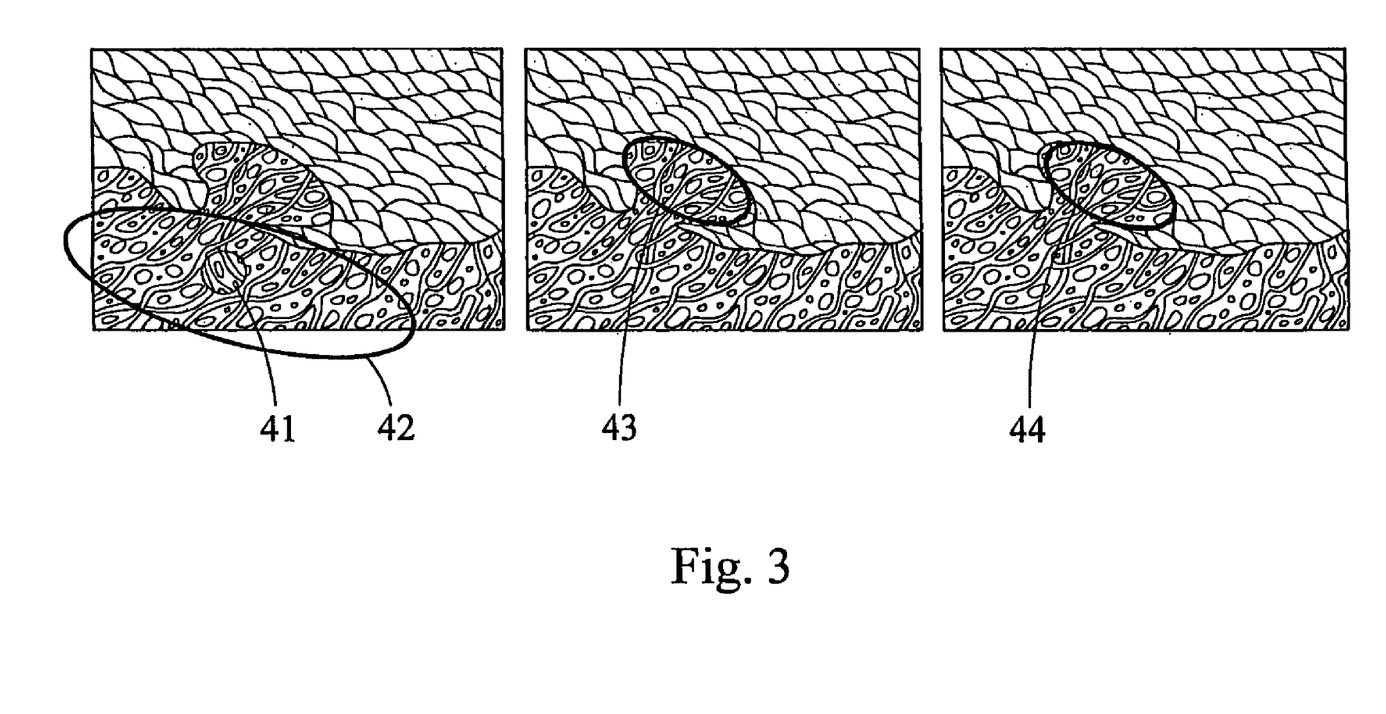
FIG. 3 is a graphical example of one embodiment of refined segmentation.

FIG. 3 shows some illustrative examples. The left-most image includes an elliptical segmentation 42 with a center 41 on undesired structure next to a large nodule. The center image illustrates subsequent segmentation 43 after removing scan data corresponding to the structure. The right-most image illustrates subsequent segmentation 44 after incorporating negative priors. The process is performed once, but may be performed iteratively, such as where a nodule may be adjacent multiple distractors. Different further processes for alteration may perform better in different situations. The process is applied independently for each marker, possible nodule, or sub-volume (i.e., local region).

The morphological opening-based and prior-constrained mean shift-based solution extended from the robust Gaussian fitting approach may effectively segment juxtapleural cases. When nodules are attached to or influenced by non-wall structures or very large nodules are attached to a thin part of the lung wall, the use of negative priors may operate better than morphological opening. The morphological opening may perform better in other situations, such as for small juxtapleural cases. The method of FIG. 1 may test for a particular situation and select an appropriate further process. Alternatively, a same further process is performed regardless of the reason for failing the test.

The segmentation may assist in diagnosis. For example, proper segmentation may provide more accurate volumetric measurement of nodules. The nodule volume, shape or variation may be clinically useful for diagnosis. For the Gaussian fitting approach discussed above, an ellipsoidal boundary approximation is used. However, further improvement of segmentation quality may be possible by incorporating a non-parametric segmentation with a Gaussian prior derived by using the proposed methods in U.S. Patent Application Publication No. 2005/0201606, the disclosure of which is incorporated herein by reference. A nodule is approximated by a Gaussian function. To obtain a finer level of segmentation, a different segmentation is performed with the Gaussian fit used as a prior. Other alterations or differences may be used.

In one embodiment, the method of FIG. 1 includes other tests or acts. For example, a multiple layer or hierarchal approach is applied. Different sized Gaussians may be used. For example, two different sub-volumes and associated segmentations are performed (e.g., 33×33×33 and 66×66×66). The large sub-volume may be reduced, such as by smoothing and down sampling, to apply the same parameters as for the smaller sub-volume. The smaller sub-volume is used first. If segmenting the smaller volume fails, the larger sub-volume is used to test for larger nodules. For example, if $\Sigma^*$ is above a threshold, the smaller segmentation may be determined as a failure, and the larger segmentation applied.

Figure 4:
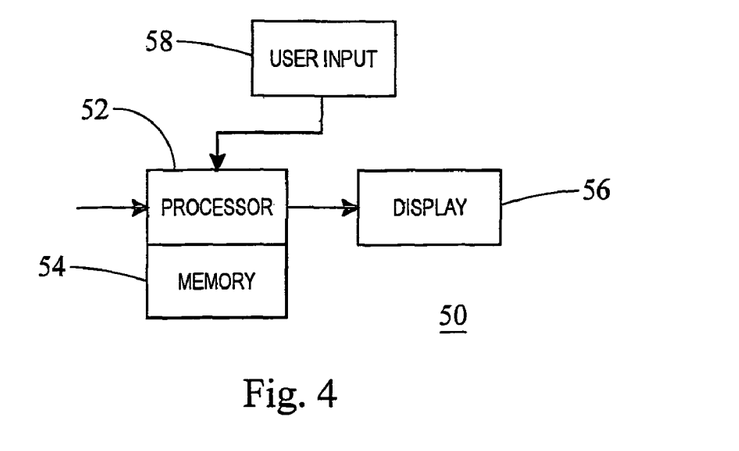
FIG. 4 is a block diagram of one embodiment of a system for refined segmentation of nodules in computer-assisted diagnosis.

FIG. 4 shows one embodiment of a system 50 for refined segmentation of nodules in computer-aided diagnosis. The system 50 is a workstation, personal computer, network, server, computer-aided diagnosis system, imaging system, computed tomography system, medical diagnostic imaging system, or other now known or later developed processing system. For example, a local or remote workstation receives images for computer-assisted diagnosis. The system 50 implements the method of FIG. 1 or a different method.

The system 50 includes a processor 52, a memory 54, a display 56, and a user input 58. Additional, different or fewer components may be provided. For example, the system 50 does not include the user input 58 and/or display 56. As another example, the system 50 includes a sensor, such as a computed tomography image former. The components are shown adjacent one another, such as in a same room, on a same cart, or in a same housing. In other embodiments, one or more components are remote, such as the memory 54 being a remote database or the display 56 being on a networked or wireless device.

The user input 58 is a keyboard, button, slider, mouse, touch pad, touch screen, trackball, dial or other now known or later developed input device. The user input 58 is part of a user interface generated or controlled by the processor 52. The user interacts with the computer-aided diagnosis system 50 to identify nodules or to calculate quantities based on segmentation. For example, the user input 58 receives a user input nodule marker location.

The processor 52 is one or more general processors, digital signal processors, application specific integrated circuits, field programmable gate arrays, servers, networks, digital circuits, analog circuits, combinations thereof, or other now known or later developed device for processing medical image data. The processor 52 implements a software program, such as manually generated or programmed code or such as a trained classification or model system. The software identifies nodule boundaries. Alternatively, hardware or firmware implements the identification. The processor 52 obtains the scan data, operation instructions and/or other information from the memory 54.

The processor 52 is operable to test a nodule segmentation as a function of scan data. The scan data is computed tomography data, but other types of data may be used. The scan data represents a nodule, such as a tumor or other structure. One example is a juxtapleural nodule in lung computed tomography. For testing, the nodule segmentation is compared with the computed tomography data. Any testing may be used, such as fitting error or heuristic testing.

The processor 52 is operable to alter the scan data, a parameter or the scan data and a parameter where a previous segmentation fails the testing. For example, the processor 52 selects scan data as a function of a morphological function. As another example, the processor 52 biases the determination of a subsequent segmentation away from the previous processor determined segmentation, such as biasing away from a wall or rib segmentation. The alteration may be a function of the scan data used for the nodule estimation, such as using the previous estimated nodule for altering.

The processor 52 is operable to determine the previous and/or subsequent segmentation. A three-dimensional Gaussian fitting is performed, but other segmentation algorithms may be used. In one example, the processor 52 determines the subsequent segmentation as a function of selected scan data with other scan data removed. In another example, the processor 52 determines the subsequent segmentation as a function of the altered parameter or segmentation process, such as associated with using a negative prior.

The memory 54 is a computer readable storage media. Computer readable storage media include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 54 stores the scan data for or during processing by the processor 52. The scan data is input to the processor 52 or the memory 54. In one embodiment, the scan data is image data. In other embodiments, the scan data is data before conversion to an image format, such as sensor data or detected data.

In one embodiment, the memory 54 is a computer readable storage media having stored therein instructions executable by the programmed processor 52. The processor 52 implements automatic or semiautomatic operations discussed herein, at least in part, with the instructions. The instructions cause the processor 52 to implement any, all or some of the functions or acts described herein. The functions, acts or tasks are independent of the particular type of instructions set, storage media, processor or processing strategy and may be performed by software, hardware, integrated circuits, filmware, micro-code and the like, operating alone or in combination. Likewise, processing strategies may include multiprocessing, multitasking, parallel processing and the like.

In one embodiment, the instructions are stored on a removable media drive for reading by a medical diagnostic imaging system, a computer-aided diagnosis system, or a workstation networked with imaging systems. An imaging system or workstation uploads the instructions. In another embodiment, the instructions are stored in a remote location for transfer through a computer network or over telephone communications to the imaging system or workstation. In yet other embodiments, the instructions are stored within the system on a hard drive, random access memory, cache memory, buffer, removable media or other device.

The display 56 is a monitor, CRT, LCD, plasma, flat screen, touch screen, projector, printer, or other now know or later developed display device. The display 56 outputs an indication of the segmentation. For example, the display 56 outputs an image generated from the scan data with an overlaid boundary based on the segmentation. As another example, the display 56 outputs a value, such as a volume, based on the segmentation. Other outputs may be provided.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for refined segmentation of nodules in computer assisted diagnosis, the method comprising:
    testing, with a processor, a first processor-determined segmentation of a nodule, the testing being a function of computed tomography scan data used to segment the first processor-determined segmentation of the nodule;
    altering, with the processor, the scan data used to segment the first processor-determined segmentation of the nodule, a parameter for segmenting, or the scan data and the parameter where the first processor-determined segmentation fails the testing; and
    re-determining the segmentation of the nodule such that a second processor-determined segmentation is determined from the scan data as a function of the altered scan data, the altered parameter or the altered scan data and the altered parameter.

2. The method of claim 1 further comprising:
    determining the first processor-determined segmentation as a pulmonary nodule segmentation as a function of the scan data;
    wherein testing comprises testing the pulmonary nodule segmentation as a function of the computed tomography data.

3. The method of claim 2 wherein determining the first processor determined-segmentation comprises fitting as a function of a nodule marker location and a three-dimensional Gaussian function.

4. The method of claim 1 wherein determining comprises fitting as a function of a three-dimensional Gaussian function.

5. The method of claim 1 wherein testing comprises testing for a juxtapleural nodule.

6. The method of claim 1 wherein testing comprises:
    analyzing errors between the first processor-determined segmentation and the scan data;
    performing a linear DC bias;
    heuristically testing; or
    combinations thereof.

7. The method of claim 1 wherein altering comprises removing scan data as a function of a morphological function, and wherein determining the second processor-determined segmentation comprises determining as a function of the scan data without the removed scan data.

8. The method of claim 7 wherein removing comprises:
    determining the morphological function based, at least in part, on the first processor-determined segmentation, a sphere, or combinations thereof;
    performing a morphological opening as a function of the morphological function; and
    masking the scan data as a function of an output of the morphological opening.

9. The method of claim 1 wherein altering comprises biasing determination of the second processor-determined segmentation away from the first processor-determined segmentation.

10. The method of claim 9 wherein biasing comprises assigning negative priors to scan data associated with the first processor-determined segmentation, and wherein determining the second processor-determined segmentation comprises determining as a function of the negative priors.

11. The method of claim 9 wherein the scan data includes a juxtapleural nodule, and wherein biasing comprises biasing away from a wall or ribs.

12. A system for refined segmentation of nodules in computer assisted diagnosis, the system comprising:
    a processor operable to test a first segmentation of a nodule as a function of scan data used to segment the first segmentation, operable to alter the scan data used to segment the first segmentation, a parameter for segmenting, or the scan data and the parameter where the first segmentation fails the testing, and operable to re-determine a second segmentation of the nodule from the scan data and as a function of the altered scan data, the altered parameter or scan data and the altered parameter; and
    a display operable to output an indication of the second segmentation.

13. The system of claim 12 wherein the processor is operable to determine the first segmentation as a nodule segmentation as a function of the scan data, the scan data comprising computed tomography data, and wherein being operable to test comprises being operable to test the nodule segmentation as a function of the computed tomography data.

14. The system of claim 13 further comprising:
a user input operable to receive a nodule marker location;
wherein the processor is operable to determine the first and second segmentations as a function of three-dimensional Gaussian fitting.

15. The system of claim 12 wherein the processor being operable to alter comprises being operable to select scan data as a function of a morphological function, and wherein the processor being operable to determine the second segmentation comprises being operable to determine as a function of the selected scan data.

16. The system of claim 12 wherein the scan data includes a juxtapleural nodule and wherein the processor being operable to alter comprises being operable to bias the determination of the second segmentation away from the first processor determined segmentation, the bias being away from a wall or ribs.

17. In a non-transitory computer readable storage media having stored therein data representing instructions executable by a programmed processor for refined segmentation of nodules in computer-assisted diagnosis, the storage media comprising instructions for:
testing a first nodule estimation of a nodule, the testing being a function of scan data used to estimate the first nodule estimation;
altering the scan data used to estimate the first nodule estimation of the nodule, nodule estimation process, or both the scan data and nodule estimation process if the first nodule estimation fails the testing; and
re-determining the estimate of the nodule such that a second nodule estimation is determined as a function of the altered scan data, the altered nodule estimation or the altered scan data and the altered nodule estimation.

18. The computer readable storage media of claim 17 further comprising:
determining the first nodule estimation as a pulmonary nodule segmentation of a juxtapleural nodule, the pulmonary nodule segmentation determined as a function of a nodule marker location, a Gaussian fitting function, and the scan data, the scan data comprising computed tomography data;
wherein testing comprises testing the pulmonary nodule segmentation as a function of the computed tomography data; and
wherein determining the second nodule estimation comprises determining as a function of the Gaussian fitting function.

19. The computer readable storage media of claim 17 wherein altering comprises selecting scan data as a function of a morphological function responsive to the scan data, and wherein determining the second nodule estimation comprises determining as a function of the selected scan data.

20. The computer readable storage media of claim 17 wherein altering comprises biasing determination of the second nodule estimation away from the first nodule estimation for a juxtapleural nodule.

21. In a non-transitory computer readable storage media having stored therein data representing instructions executable by a programmed processor for refined segmentation of nodules in computer-assisted diagnosis, the storage media comprising instructions for: determining a filter shape as a function of scan data; filtering the scan data as a function of the filter shape; and segmenting a first nodule as a function of the filtered scan data;
determining a second nodule segmentation as a function of a Gaussian function fit to the scan data;
testing the second nodule segmentation as a function of scan data; and performing the determining the filter shape, filtering and segmenting if the second nodule segmentation fails the testing, the determining the filter shape and filtering comprising removing some scan data, and the segmenting comprising determining the first nodule segmentation as a function of another Gaussian function fit to the scan data without the removed scan data.

22. The computer readable storage media of claim 21 wherein determining the filter shape comprises fitting a Gaussian function to the scan data, and determining the filter shape as a function of an ellipsoid responsive to the fitting.

23. The computer readable storage media of claim 21 wherein the first nodule comprises a pulmonary nodule segmentation of a juxtapleural nodule, the scan data comprising computed tomography data.

24. The computer readable storage media of claim 21 wherein determining the filter shape comprises binarizing the scan data as a function of a first threshold, determining an average diameter of an initial nodule estimation, initializing a three-dimensional structural element as a function of the initial nodule estimation if the average diameter is greater than a second threshold and as a function of a predetermined structure if the average diameter is less than the second threshold, the filter shape comprising the three-dimensional structural element;
wherein filtering comprises performing a three-dimensional binary morphological opening as a function of the three-dimensional structural element and masking the scan data as a function of an output of the three-dimensional binary morphological opening; and
wherein segmenting the first nodule comprises estimating the first nodule as a function of the masked scan data.

25. In a non-transitory computer readable storage media having stored therein data representing instructions executable by a programmed processor for refined segmentation of nodules in computer-assisted diagnosis, the storage media comprising instructions for: determining a first nodule estimation of a nodule from scan data;
identifying the first nodule estimation as associated with a possible juxtapleural nodule; and
biasing a process for determination of a second nodule estimation of the nodule from the scan data away from the first nodule estimation;
wherein determining the first nodule estimation comprises fitting a Gaussian function to computed tomography scan data, wherein biasing comprises shifting determination of the second nodule estimation away from wall or rib structure represented by the computed tomography scan data and adjacent the possible juxtapleural nodule, the first nodule estimation associated with the wall or rib structure, and wherein biasing comprises fitting the Gaussian function to the computed tomography scan data as a function of biases associated with the first nodule estimation.

26. The computer readable storage media of claim 25 wherein biasing comprises assigning a negative prior to the scan data for at least one location associated with the first nodule estimation.

27. The computer readable storage media of claim 25 wherein biasing comprises constraining a mean shift with a Gaussian repelling prior.

28. The computer readable storage media of claim 25 wherein determining the first nodule estimation comprises determining a function of a Gaussian function fit to the scan data; wherein identifying comprises testing the first nodule estimation as a function of the scan data, the testing identifying a possible wall attached nodule associated with the first nodule estimation.

* * * * *